July 30, 1935.  A. C. PURPURA  2,009,634
AUTOMATIC TOASTER
Original Filed Aug. 25, 1932
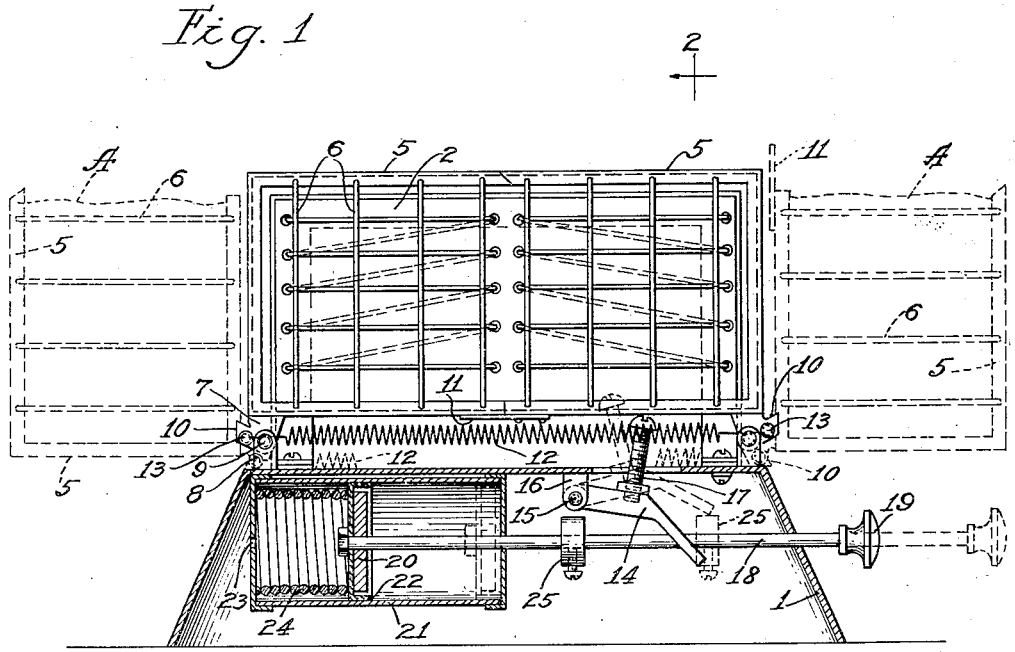
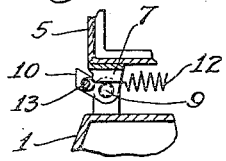
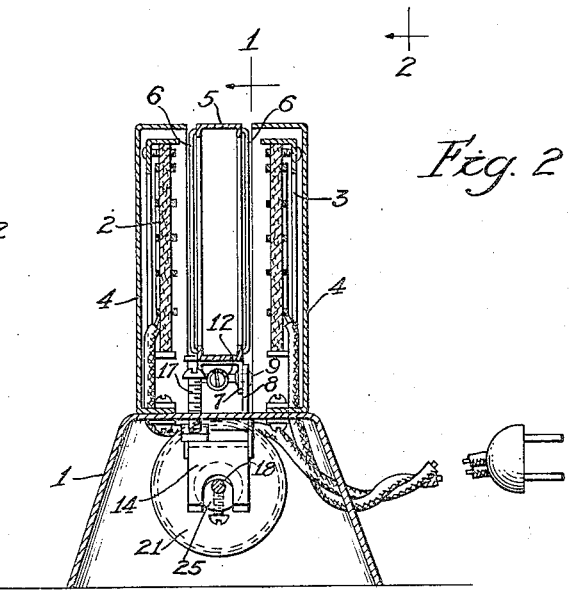
Inventor:
August C. Purpura
Charles B. Rasmussen
Atty.

Patented July 30, 1935

2,009,634

UNITED STATES PATENT OFFICE 2,009,634

AUTOMATIC TOASTER

August C. Purpura, Chicago, Ill.

Refiled for abandoned application Serial No. 630,434, August 25, 1932. This application September 27, 1934, Serial No. 745,680

9 Claims. (Cl. 53—5)

This invention relates to automatic toasters and is a substitution for application Serial No. 630,434 filed August 25, 1932.

A principal object of the invention is the provision of a simple and novel device for toasting bread or the like, of rugged and durable construction, which may be built at a low cost and which will automatically shift the bread or other article out of the heating zone after it has been in toasting position for a predetermined length of time.

Numerous other objects and advantages of the invention will be apparent as it is better understood from the following description, which, taken in connection with the accompanying drawing, discloses a preferred embodiment thereof.

On the drawing,

Figure 1 is a vertical section taken substantially on the line 1—1 of Fig. 2, the movable parts being shown in different position in full lines and in dotted lines;

Fig. 2 is a section taken substantially on the line 2—2 of Fig. 1; and

Fig. 3 is a sectional view illustrating one of the hinge joints.

Referring to the drawing, reference character 1 represents a suitable support in the form of a hollow sheet metal base. Mounted on and rising from the base are two long, high flat heating elements of any usual or suitable construction, indicated at 2 and 3. These heating elements are opposite and parallel to each other but are spaced apart far enough to permit holders for bread to be toasted to be positioned between them. The heating elements are conveniently covered by sheet metal shields 4, 4 extending over the outer sides and the top and end edges of the heating elements. The structure is preferably made long enough to permit two slices of bread, placed end to end, to be toasted simultaneously, in which case separate holders are provided for the two slices, this being the particular construction illustrated.

Each holder may conveniently consist of a U-shaped frame 5, the members of which are U-shaped in cross section, the troughs in the members of the frame being on the inner sides.

The side members or arms of each frame are joined together by a few parallel rods or wires 6, there being two sets of these rods or wires, one on each broad face of the frame as a whole. Therefore, each holder, consisting of the frame and the connecting wires, forms a receptacle open at one end. A slice of bread may be slipped into each holder through the open end thereof, being prevented from dropping out sidewise by the wires or rods between which it lies. The two holders are mounted on the base in such a manner that when they are in their working or toasting positions they lie end to end between the two heating elements, their open ends being next to each other. The two holders are hinged to the base at the ends of the heating elements; that is to say, the hinges are in the vicinity of the ends of the heating elements and preferably beyond such ends.

The hinge axes are horizontal and at right angles to the planes of the heating elements so that the holders may swing in their own planes from their working positions between the heating elements into idle positions beyond the opposite ends of the heating elements.

In the arrangement shown, each holder has at its lower corner at the closed end a downwardly projecting ear 7 which is connected to a lug 8 rising from the base member by a horizontal rivet 9 which constitutes a hinge pin. Each of the ears 7 is preferably provided with a lug 10 projecting outwardly therefrom and so positioned and so shaped that, when the holders are swung out from between the heating elements, the lugs 10 will rest on top of the base, as shown in dotted lines in Fig. 1, and cause the holders to be supported with their open ends at the top. A slice of bread, indicated in dotted lines at A in Fig. 1, may be inserted in each of the holders while the holders are in their outer idle positions, so as to be placed in proper toasting relation to the heating elements when the holders are swung into their working or toasting positions.

The free ends of the arms of the frames of the two holders abut against each other when the holders are in toasting position, so that the inner ends of the holders serve as mutual supports for each other. One of the holders is preferably provided with a finger 11 that projects underneath the other holder when they are in toasting positions, so that, when the first holder is swung outwardly, it will act on the other holder and swing it in the opposite direction.

Means are preferably provided yieldingly to hold the holders in each of their two positions. Furthermore, it is advantageous to insure that the holders will complete their swinging movements in either direction after such movements have been initiated. I therefore connect the two holders together by a long tension spring 12 which lies parallel to and not far from a line connecting the hinge axes of the holders.

The ends of the springs are hooked over pins 13 on the lugs 10. These pins are so located that, when the holders are in their toasting positions, the line connecting the pins is a little above the line connecting the hinge axes; whereas when the holders are swung out into their dotted line positions, the line connecting the pins 13 drops a considerable distance below the hinge axes. Therefore the spring acts to hold the holders in their toasting positions as well as in their idle positions, by reason of the fact that the line of pull of the spring is carried past center.

Since the line of pull of the spring lies only slightly above the hinge axes when the holders are in their toasting positions, only a slight movement of the holders toward their idle positions is necessary to carry the spring past center and cause it to exert its power in a direction to complete the outward swinging movements of the holders. This is of particular advantage in connection with automatic operation of the holders to carry the bread out of the toasting zone after the toasting has been completed, since the actuating means to initiate the movements of the holders toward their idle positions need not move the holders very far.

In order to trip the holders to start them in the direction of their idle positions, I employ an arm or lever 14 located within the hollow base and hinged at one end, as indicated at 15, to an ear 16 depending from the top wall of the base. Rising from this arm, between the ends thereof is a screw 17. The arm and its screw are in the plane of the holders and the screw underlies that holder which is provided with the finger 11. Therefore, when the arm 14 is swung up, the screw strikes the bottom edge of one of the holders, causing that holder to swing upward and carry with it the other holder. As soon as the holders have been swung by the arm through a short predetermined angle, the spring 12 becomes effective to continue and complete the swinging movements of the holders.

Means are provided for automatically actuating the arm 14 after the bread to be toasted has been in the toasting zone for a predetermined length of time. The actuating means for the lever 14 consists of a rod or stem 18 extending horizontally through one end wall of the base and having on its outer end a head or button 19, the rod or stem being in the same vertical plane as the lever 14 and underlying this lever. On the inner end of the rod or stem is a piston 20 having a sliding fit in a cylinder 21.

The piston is so constructed, conveniently by covering it with a leather cup-shaped washer 22, that when the rod or stem is pushed inward the air can flow freely past the piston from the rear end of the cylinder toward the front end, whereas when there is an excess of fluid pressure in the cylinder in front of the piston there can be no flow of fluid rearwardly past the latter.

The cylinder has a small hole or port 23, behind the piston, which will permit air to enter the cylinder very slowly when a partial vacuum is created in the cylinder behind the piston. Therefore, if a spring is associated with the piston or with the stem, tending constantly to move the piston and the stem forward, energy being stored up in the spring when the stem is pushed in, it will be seen that, when the pressure on the stem is released, the spring will move the piston and the stem forward; but, because there can be no transference of air between the two ends of the cylinder during this movement of the piston, a partial vacuum will be created in the rear end of the cylinder, and the movement of the piston will therefore be slow. The rate of forward movement of the piston, under the action of the spring depends upon the size of the opening or port 23 which determines the rate at which air can enter the cylinder behind the piston. In the embodiment shown the spring for actuating the piston is a compression spring 24 housed in the cylinder behind the piston.

On the rod or stem 18 is a block or collar 25 adjustable along the stem. When the piston is moved forward a predetermined distance after having first been brought to the end of its inward stroke, the block or collar will engage under the free end of the lever 14 and swing the lever up, as shown in dotted lines in Fig. 1, thereby causing the holders to be swung far enough in the direction of their idle positions to permit the spring 12 to complete the movements of the holders and bring them into their idle positions, as heretofore explained.

It will be seen that the time that must elapse after the stem has been pushed in, before the holders will be swung out of their toasting positions, depends not only on the rate at which the air can enter the port 23, but also on the point at which the block or collar 25 is secured along the stem.

In Fig. 1 of the drawing the piston is shown as at the limit of its backward movement. If the collar or block 25 be moved closer to the front end of the cylinder, it will take longer for it to contact with the arm 14 when pressure on the stem is released so as to permit the spring 24 to act. On the other hand, if this block or collar be shifted along the stem so as to come nearer the arm 14, the holders will be operated more quickly than with the collar or block in the position of adjustment shown. It is therefore possible very accurately to regulate the time during which the bread remains in toasting position.

It will thus be seen that a simple and novel automatic toaster is produced, in which the slices of bread move down by gravity into the holders, and in which the holders are shifted between working and idle positions in such a way that there is no danger that the bread or the toast will become displaced or drop out. It will also be seen that it is a simple matter to insert the bread and remove the toast and, as heretofore explained, nicely to regulate the toasting period so as to give to the toast exactly the qualities desired therein.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a toaster, a support including a hollow base, two high parallel heating elements rising from said base opposite and in spaced relation to each other, a holder for bread to be toasted standing on edge between said heating elements when in its working position, a hinge connecting one lower corner of said holder to said support adjacent to one end of said heating elements to permit said holder to swing in its own plane into an idle position outwardly from the ends of said heating elements, a lever mounted in said base for vertical swinging movements in a plane parallel to the planes of said heating elements, a part on said lever lying below and normally out of contact with the holder when the latter is in its working position and adapted to be engaged with the holder when the lever is swung up, thereby lifting the holder, and a timing device mounted in said base to actuate said lever and including a part movable in the plane of and underneath said lever in a direction to engage with the lever and swing it up.

2. In a toaster, a support including a hollow base, two high parallel heating elements rising from said base opposite and in spaced relation to each other, a holder for bread to be toasted standing on edge between said heating elements when in its working position, a hinge connecting one lower corner of said holder to said support adjacent one end of said heating elements to permit said holder to swing in its own plane into an idle position outwardly from the ends of said heating elements, a lever mounted in said base for vertical swinging movements in a plane parallel to the planes of said heating elements, a part on said lever lying below and adapted to be engaged with the holder when the lever is swung up, thereby lifting the holder, and a timing device mounted in said base to actuate said lever and including a part movable in the plane of and underneath said lever in a direction to engage with the lever and swing it up.

3. The combination with a toaster including a hollow base, heating means and a movable toast holder mounted on top of said base, of a lever arranged in said base and pivoted at one end near the top of the base for swinging movements in a vertical plane, a part on said lever extending up through the base to operate said holder, said part being unconnected with the holder but being adapted to be brought into engagement when the lever is swung up, said lever having a downwardly inclined edge portion near its free end, a timing device mounted in the base and having a horizontal rod adapted to be moved in the direction of its length, and a part on said rod adapted to engage with the inclined under edge of said lever and cause the lever to be swung up when the rod is moved a predetermined distance in one direction.

4. In a toaster, a support including a hollow base, two high parallel heating elements rising from said base opposite and in spaced relation to each other, a holder for bread to be toasted hinged to said base and adapted to swing between a working position in which it lies between said heating elements and an idle position, a lever located within the upper portion of said hollow base and hinged to the base for vertically swinging movements, a part on said lever projecting up through said base and adapted to be brought into contact with the under side of said holder to swing the latter toward its idle position when the lever is raised, said lever having a downwardly inclined portion, a timing device mounted in said hollow base and including a horizontal lengthwise movable rod, and a shoulder on said rod in position to engage with said inclined portion of the lever, when the rod is moved in one direction, and thus cause the lever to swing up.

5. In a toaster, a support including a hollow base, two high parallel heating elements rising from said base, opposite and in spaced relation to each other, a holder for bread to be toasted hinged to said base and adapted to swing between a working position in which it lies between said heating elements and an idle position, a lever located within the upper portion of said hollow base and hinged to the base for vertically swinging movements, a part on said lever projecting up through said base and adapted to be brought into contact with the under side of said holder to swing the latter toward its idle position when the lever is raised, said lever having a downwardly inclined portion, a timing device mounted in said hollow base and including a horizontal lengthwise movable rod below and in the plane of said lever, and a shoulder on said rod in position to engage with said inclined portion of the lever, when the rod is moved in one direction, and thus cause the lever to swing up.

6. The combination with a toaster including a hollow base, heating means and a movable toast holder mounted on top of said base, of a lever arranged in said base and pivoted at one end near the top of the base for swinging movements in a vertical plane, a part on said lever extending up through the base to operate said holder, said part being normally out of engagement with the holder but being adapted to be brought into engagement when the lever is swung up, said lever having a downwardly inclined edge portion near its free end, a timing device mounted in the base and having a rod underlying said lever in the plane of the lever and adapted to be moved in the direction of its length, and a part on said rod adapted to engage with the inclined under edge of said lever and cause the lever to be swung up when the rod is moved a predetermined distance in one direction.

7. In a toaster, a support, two bread holders adapted to stand end to end in their working positions, hinges connecting said holders at their outer ends to the support to permit the holders to be swung in the plane thereof away from each other into idle positions, heating elements on the support on opposite sides of said holders when the latter are in their working positions, means connected to said holders to swing each into either of its said positions when it is swung a predetermined distance toward that position from the other position, and a part on one holder adapted to engage with the other holder and move the latter through said predetermined distance when the former is moved a corresponding distance from its working position.

8. In a toaster, a support, two long, high, parallel heating elements rising from said support opposite and in spaced relation to each other, two holders for bread to be toasted, adapted to be disposed end to end between said heating elements in their toasting position, hinges between said holders and said support at the ends of the heating elements adapted to permit the holders to be swung outwardly in opposite directions beyond the ends of the heating elements into their idle position, a spring under tension connecting the holders together, the point of connection between the spring and each holder being above the hinge axis when the holders are in one of the aforesaid positions and to lie below the hinge axis when the holders are in the other of the aforesaid positions, and a part on one holder adapted to engage with the other to cause both holders to swing up in unison with each other when the first holder is swung upwardly.

9. In a toaster, a support, two bread holders adapted to stand end to end in their working positions, hinges connecting said holders at their outer ends to the support to permit the holders to be swung in the plane thereof away from each other into idle positions, heating elements on the support on opposite sides of said holders when the latter are in their working positions, means connected to said holders to swing each into either of its said positions when it is swung a predetermined distance toward that position from the other position, a part on one holder adapted to engage with the other holder and move the latter through said predetermined distance when the former is moved a corresponding distance from its working position, a vertically swinging lever below the holder having thereon the aforesaid part, means on said lever to engage with the lower edge of the overlying holder and cause said holder to be swung upwardly through said predetermined distance when the lever is swung up, and a timing device for actuating said lever.

AUGUST C. PURPURA.